United States Patent Office 3,527,721
Patented Sept. 8, 1970

3,527,721
WATER - SOLUBLE SYNTHETIC RESIN COATING COMPOSITIONS CAPABLE OF ELECTRODEPOSITION
Herbert Hönel and Wolfgang Daimer, Graz, Austria, assignors to Vianova Kunstharz, A.G., Vienna, Austria, a corporation
No Drawing. Filed Oct. 3, 1967, Ser. No. 672,429
Claims priority, application Austria, Oct. 6, 1966, A 9,366/66
Int. Cl. C09d 3/52, 3/66, 5/24
U.S. Cl. 260—21
22 Claims

ABSTRACT OF THE DISCLOSURE

A process for producing water-soluble synthetic resins capable of electrodeposition in thin, uniform films is described. According to the process, a polycarboxylic acid resin and an aminoplast resin are heated at temperatures below about 120° C. to obtain a water-insoluble reaction mass. The water-insoluble reaction mass is then neutralized with a water-soluble nitrogen base to produce a water-soluble composition. The water-soluble compositions while being particularly suitable for electrodeposition can be applied using other techniques such as dipping, spraying, and flow coating.

FIELD OF INVENTION AND BACKGROUND

This invention is directed to improved coating compositions and the process of making same. More particularly, the invention is directed to a process of producing aqueous coating compositions capable of electrodeposition in thin, uniform films. The coating compositions of the aforesaid process comprise a water-insoluble reaction product of a polycarboxylic acid resin and an aminoplast resin neutralized with a water-soluble nitrogen base to provide a water-soluble composition.

It is known to produce coating compositions from mixtures of polycarboxylic acid resins and aminoplast resins which are partially or completely neutralized with ammonia or organic nitrogen bases. According to the prior art, in preparing the aforesaid mixtures the aminoplast resin had to be water soluble or at least hydrophilic in order to obtain satisfactory solubility of the resins in the water of the entire system. In preparing such compositions, considerable technical difficulties arise in the production of water-soluble or hydrophilic aminoplast resins. Furthermore, when using a blend of components, difficulties were encountered when electrodepositing coatings where the aminoplast resins would deposit on the anode in lower proportions in relation to their presence in the electrodeposition bath. The resultant films would not achieve adequate hardness on stoving and the relative proportion of aminoplast resin in the bath would increase to such a degree that it could not be controlled, eventually rendering the bath useless.

Additionally, it is known from British Pat. No. 815,179 to use neutralized condensation products of polycarboxlyic acid resins and water-insoluble aminoplast resins as aqueous coating compositions for dipping, spraying, or flow coating. If such products are used for electrodeposition, the disadvantages mentioned above are not encountered, but numerous other difficulties arise, such as poor stability of the bath and lack of uniformity of the stoved films owing to insufficient flow on stoving.

OBJECTS AND GENERAL DESCRIPTION OF INVENTION

It has now been found that aqueous coating compositions for electrodeposition not having the above-mentioned disadvantages can be obtained from condensation products of polycarboxylic acid resins and water-insoluble aminoplast resins, if the polycarboxylic acid resins contain free carboxyl groups of aliphatic and/or hydroaromatic polycarboxylic acids exclusively, or substantially exclusively. It is theorized that the disadvantages of the products according to British Pat. No. 815,179 are due to the fact that the polycarboxylic acid resin contains free carboxyl groups of aromatic polycarboxylic acids.

The condensation products of the present invention are homogeneous resins. Being exceptionally stable, they are specially suitable for continuous performance in electrodeposition baths. The obtained coatings show a uniform surface, very good gloss, excellent resistance to corrosion and good mechanical properties, such as hardness and flexibility. A further advantage of the compositions of the invention is that substantially lower stoving temperatures, i.e., between 120 and 160° C., can be employed to achieve the final hardness. Through the use of lower stoving temperatures as well as due to the fact that the co-employment of hardening components such as the phenolic resins which will darken on stoving are no longer required, it is possible to obtain electrophoretically deposited stoved films of up to now unequalled lightness.

The polycarboxylic acid resins suitable for the present process are produced through esterification of aliphatic and/or hydroaromatic polycarboxylic acids, and/or their anhydrides, with polyols. Optionally, and preferably, unsaturated oil fatty acids or rosin can be used in the mixtures. The polycarboxylic acid resins may contain free, preferably primary, hydroxyl groups. Examples of suitable aliphatic polycarboxylic acids are succinic acid, glutaric acid, maleic acid, adipic acid, fumaric acid, itaconic acid, citric acid and their anhydrides if available. Examples of hydroaromatic polycarboxylic acids are camphor acid, tetrahydrophthalic acid and their alkyl substituted derivatives and their anhydrides. Furthermore, polycarboxylic acids or anhydrides formed by adduct formation of maleic anhydride or analogous dienophilic compounds and unsaturated oil fatty acids or rosin acids are specially suitable. The unsaturated oil fatty acids can be replaced by their triglycerides, e.g., linseed oil, soya bean oil, safflower oil, dehydrated castor oil, tung oil, or oiticica oil. Moreover, the natural triglycerides can be replaced by synthetic hydroxyl-free polyesters of oil fatty acids. Such synthetic hydroxyl-free polyesters can be modified with rosin acids (colophony, tall oil fatty acids) or with inert mono- or poly-basic carboxylic acids which do not participate in the adduct formation. The adducts can be partially esterified with polyols, optionally after hydrolysis of the anhydride groups, in order to introduce preferably primary hydroxyl groups into the polycarboxylic acid resin. In some cases it may be sufficient to hydrolyze the anhydride groups of the adducts without further esterification with polyols.

In the present process it is possible to co-employ aromatic polycarboxylic acids, such as phthalic acids or trimellitic acid. The total acid value of the polycarboxylic acid resin may range from about 30 to about 200. The acid value which is contributed by the presence of aromatic polycarboxylic acids, however, can be no more than about 20, the balance being due to the presence of free carboxyl groups of aliphatic and/or hydroaromatic polycarboxylic acids. Through this measure storage stability of the aqueous coatings produced from the condensation products of the invention and flow during the stoving of an electrophoretically deposited film will not be diminished. Unesterified carboxyl groups of aromatic polycarboxylic acids as described in British Pat. No. 815,179, accelerate the condensation reaction between the polycarboxylic acid resin and the aminoplast resin. However, for the same reason, an electrophoretically deposited (and thus solvent-free) film will cure too fast, causing deficiencies of flow and gloss.

Examples of polyols suitable for producing the polycarboxylic acid resins of the invention are glycols, trimethylol propane, pentaerythritol, etc., or compounds of higher molecular weight, particularly compounds carrying epoxy groups. In cases where the polycarboxylic acid resin is produced from unsaturated compounds, also copolymers thereof with monovinyl compounds can be used, e.g., styrol, alpha-methyl styrol, vinyl toluol, vinyl esters and functional derivatives of acrylic or methacrylic acid.

Aminoplast resins suitable for the present invention are polymethylol compounds of formaldehyde and amino compounds, partially etherified with alcohols. Examples of suitable amino compounds are urea, thiourea, melamine, benzoguanamine or other amino triazines. For etherification mainly aliphatic monoalcohols having from 1–9 carbon atoms or their semi ethers with diols are used. Since alcohols with more than 4 carbon atoms have limited miscibility with water, it is easier to etherify the aminoplasts with the lower molecular weight alcohols than with alcohols having more than 4 carbon atoms. It is thus possible to obtain highly etherified aminoplast resins which are generally preferred in the present process. A high degree of etherification can also be obtained with higher boiling semi ethers of diols. A high degree of etherification as used herein means that at least half of the methylol groups are etherified.

If the polycarboxylic acid resin does not contain hydroxyl groups, a lower degree of etherification of the aminoplast resin is preferred.

It is an advantage of the present invention that highly etherified water-insoluble aminoplast resins can be used, which can be produced in a simple manner. The water-soluble aminoplast resins which are also highly etherified with low molecular weight alcohols or semi ethers of diols, and whcih may also be co-employed, can only be produced at higher costs.

The aminoplast resins etherified with butanols or higher alcohols become water soluble after the condensation reaction with the polycarboxylic acid resin and neutralization of the condensation product.

The reaction between the polycarboxylic acid resin and the aminoplast resin is carried out at between 50 and 120° C., and preferably at between 70–100° C. The reaction substantially consists in an etherification of N-methylol groups of the aminoplast resin with reactive hydroxyl groups of the polycarboxylic acid resin, and if radicals of unsaturated oil fatty acids or of rosin acids are present, in the polycarboxylic acid resin, these condense with N-alkylo groups. The lowest degree of reaction necessary is obtained, when the reaction product has become water soluble upon neutralization. It is evident that a considerable portion of reactive groups of the aminoplast resin remains intact, and these groups will only react at the much higher stoving temperatures during the curing reaction.

Usually, the reaction products contain the organic solvents which are already present during the production of the aminoplast resin. It may be necessary to add further solvents at the beginning of the condensation reaction in order to homogenize the reaction mixture. Optionally, the solvents may be withdrawn from the condensation product after the reaction.

The reaction product is neutralized with a base to a pH value of between 7.0 and 9.0 in a 10 percent aqueous solution. Suitable bases for neutralization are inorganic or organic nitrogen bases, such as ammonia, hydroxyl amine, monoethyl amine, diethyl amine, triethyl amine, and the alkanol amines, such as monoethanol amine, diethanol amine, and dimethylethanol amine.

It is understood that the aqueous coating compositions of the invention can be applied by dipping, spraying, flow coating, etc., as well as by electrodeposition.

Having described the invention in general terms, the following examples, wherein parts are by weight unless otherwise stated, are being set forth to more fully illustrate its application and are not intended to be limiting.

EXAMPLE 1

(a) 400 parts butanol, 167 parts paraformaldehyde and 0.4 parts triethyl amine are heated to 100° C. and held at approximately 100° C. until the solution becomes clear. 100 parts melamine are added and the mass is again held at 100° C. until a free formaldehyde determination yields not more than 9 percent. 2 parts phthalic anhydride and 5 parts petrol ether are added while slowly increasing the temperature. The water is distilled off with the butanol serving as an entraining agent. When the solid content reaches 430 parts, the mass is concentrated under vacuum to 80 percent solids. After cooling, 2 parts triethyl amine are added. From the content of free formaldehyde in the resin and the distillate, from the amount of water formed and from the solid content it can be calculated that an average of 5.5 mols formaldehyde and 4.5 mols of butanol have reacted with 1 mol of melamine.

(b) A mixture of 60 parts linseed oil, 300 parts dehydrated castor oil, 90 parts rosin and 11 parts glycerol is esterified by heating to an acid value of below 5. While maintaining the reaction charge at 200° C., 100 parts maleic anhydride are added. The mass is held at 200° C. until the reaction with maleic anhydride is substantially complete. After cooling to 90° C., 15 parts distilled water are added. The admixture is held at 90° C. for three hours. Thereafter, the mass is esterified with 68 parts ethylene glycol at 140–150° C., until an acid value of 75 is obtained. At 80° C., the resin is diluted with 62 parts diacetone alcohol.

(c) 86 parts of the melamine resin of 1a above at 80 percent solids and 222 parts of the polycarboxylic acid resin of 1(b) above at 90 percent solids are held at 80° C. until a sample neutralized with ammonia has become clearly soluble in water. The reaction requires about 90 minutes. After cooling to 30° C., the reaction product is neutralized with 21 parts triethyl amine. The product has a solid content of 82 percent.

(d) 160 parts of reaction product 1(c) are ground, e.g., in a disc muller, with 40 parts titanium dioxide and are diluted with 1150 parts distilled water. The pH value is adjusted to 7.8 with triethyl amine. Two electrodes (100 x 100 x 1 mm.) of zinc-phosphated steel plate are dipped into the paint bath at a distance of 70 mm. A direct current of 120 volts is passed between the two anodes for 1 minute. The coated anode is withdrawn from the bath, rinsed, and stoved for 30 minutes at 140–150° C. The obtained film is white, hard, flexible and has a thickness of 25 microns.

The analytically determined content of nitrogen of the film corresponds to the relative content of the resin.

EXAMPLE 2

(a) 885 parts ethylene glycol monobutyl ether, 210 parts paraformaldehyde (96 percent formaldehyde), and 1 part triethyl amine are heated to 100° C. and held at 100° C. until the solution becomes clear. 126 parts melamine are added and the charge again held at 100° C. until a free formaldehyde determination indicates less than 7 percent. 3 parts phthalic anhydride and 20 parts petrol ether are added. The water is distilled off at 125° C. until the solids content reaches 590 parts at which time the solution is concentrated under vacuum to 85 percent non-volatile. It can be calculated from the solids yield that about 3 mols of ethylene glycol monobutyl ether have reacted with 1 mol of melamine.

(b) 540 parts trimethylol propane, 300 parts of a mixture of synthetic fatty acids having from 7 to 9 carbon atoms are esterified by heating to an acid value of below 3 using a suitable reflux condenser to prevent loss of fatty acids. 438 parts adipic acid are added and the esterification is continued until the acid value of the polycarboxylic acid resin has reached 56. It is evident that the acid value is almost exclusively due to the adipic acid.

(c) 264 parts of the melamine resin solution of 2(a) above at 85 percent solids, 400 parts of the polycarboxylic resin of 2(b) above, and 100 parts isopropanol are mixed The homogeneous blend is heated to 90° C. The temperature is slowly raised further to 103° C. Most of the isoproponal will distill off. After a neutralized sample has become water soluble (after about 40–45 minutes), the mass is cooled and neutralized with 30–40 parts triethyl amine in the presence of water. More water is added to obtain a total volume of 1040 parts. The resin solution obtained has a solids content of 60 percent.

(d) A white enamel is made from resin 2(c) above, using a procedure similar to that described in Example 1(d). The stoving temperature is raised to 160° C. The obtained film is white and very flexible.

If other nitrogen bases, including ammonia, are used for neutralization, the stoved films are also very light in color.

EXAMPLE 3

(a) A melamine resin is prepared exactly as described hereinbefore in Example 2(a).

(b) 400 parts of the polycarboxylic acid resin prepared in Example 2(b) and 10 parts phthalic anhydride are held at 150–155° C. for 15 minutes with vigorous stirring. The obtained acid value is 62. The proportion of the acid value which is due to partially esterified phthalic acid is 9 at the most.

(c) Employing a procedure similar to that described in Example 2(c), a mixture using the proportions as in Example 2(c) of melamine resin 3(a) and the modified polycarboxylic acid resin of 3(b) is heated to 95° C. In this case water solubility is achieved more easily. As soon as a neutralized sample is soluble in water, the greatest part of the isopropanol, which served as mediating solvent, is distilled off under reduced pressure. The mass is neutralized with 44 parts triethyl amine and water is added to obtain a total volume of 1060 parts.

(d) An anode is coated employing a procedure similar to that described in Example 1(d). With equal stoving temperatures, curing is considerably faster than when using the products of Example 2.

The isopropanol mediating solubility between the aminoplast resin and the polycarboxylic acid resin in Examples 2 and 3 can be replaced by other inert solvents, including methyl ethyl ketone, acetic acid ethyl ester, or benzol and toluol. If the latter solvents are used, it is advisable to distill them off completely.

EXAMPLE 4

(a) A melamine resin is prepared as described in Example 2a. However, the resin is etherified only to a solid content of 525 parts. The solution is then reduced to a solid content of 75 percent.

(b) 85 parts trimethylol propane, 170 parts tall oil fatty acid (rosin acid free) and 85 parts dehydrated castor oil are esterified by heating at a temperature above 200° C. to an acid value of below 3. 88 parts adipic acid is added to esterify all the alcoholic hydroxyl groups present. An acid value constant at 36 is obtained. To this hydroxyl-free polyester 30 parts maleic anhydride are adducted completely at 200° C. After cooling to 90° C., the anhydride groups are hydrolyzed with 6 parts water and the resin is diluted with 48 parts diacetone alcohol.

(c) 444 parts of the polycarboxylic acid resin of 4(a) above at 90 percent solids, and 178 parts of the melamine resin of Example 4(a) above at 75 percent solids are held at 80–90° C. until a sample neutralized with triethyl amine has become clearly soluble in water. The mass is cooled to 30° C. and neutralized with 50 parts triethyl amine in the presence of 40 parts water. A 75 percent solids resin solution s obtained.

(d) A white, hard, and flexible film is obtained using the procedure described in Example 1(d).

EXAMPLE 5

(a) A mixture of 60 parts linseed oil, 300 parts dehydrated castor oil, 90 parts rosin and 11 parts glycerol is esterified in known manner to an acid value of below 5. At 200° C. 100 parts maleic anhydride are added and held at 200° C. until the maleic anhydride has reacted completely. At 160° C. a mixture of 144 parts vinyl toluene and 3.7 parts ditertiary butylperoxide is added over a period of two hours. The temperature of the reaction charge is maintained at 200° C. for another hour. After cooling to 90° C., 15 parts distilled water are added and the bath is held at 90° C. for three hours. Then the mass is esterified at 140–145° C. with 68 parts ethylene glycol until the acid value has reached 75. After cooling to 80° C. the resin is diluted with 62 parts diacetone alcohol.

(b) The polycarboxylic acid resin of 5(a) is reacted with an aminoplast resin prepared in accordance with Example 1(a) using the procedure set forth in Example 1(c). A white, hard, flexible film is obtained using the procedure described in Example 1(d).

EXAMPLE 6

(a) 220 parts n-butanol are heated with 80 parts 85 percent paraformaldehyde and 15 parts water at a pH value of 8 (adjusted with triethyl amine) until the solution has become clear. At 80° C. 60 parts urea and 10 parts n-butanol are added. The charge is held at 80° C. under weakly alkaline conditions until the content of free formaldehyde has fallen below 5 percent of the whole reaction mass. 2 parts phthalic anhydride are added. A pH value check indicates the charge is now acidic. The temperature is raised while removing water of esterification. The distilled butanol is returned to the reaction vessel using a suitable reflux condenser. As soon as a solid content of 52 percent is obtained, the excess of acid is neutralized with triethyl amine and the batch is concentrated under vacuum to a solid content of 75 perecnt.

(b) 100 parts maleic anhydride, 525 parts trimethylol propane and 300 parts of synthetic fatty acids having from 7 to 9 carbon atoms are esterified to an acid value of below 3. 400 parts adipic acid are added and the temperature held at 160–180° C. until the acid value has fallen below 70. The temperature is dropped to about 100° C. and the mass is dissolved with 120 parts diacetone alcohol.

(c) 75 parts of the urea resin solution of Example 6(a) and 110 parts of the polycarboxylic acid resin of Example 6(b) are held at 70° C. for two hours with stirring. A sample neutralized with one normal ammonia is now clearly soluble in water. After cooling to 40° C. the mass is neutralized with 8.5 parts dimethyl ethanol amine and diluted to 80 percent solids with 2 parts water.

(d) A white, hard, and flexible film is obtained using the procedure described in Example 1(d).

As will be apparent to one skilled in the art, numerous modifications can be made in the utilization of the process for preparing water-soluble compositions and in the water-soluble compositions without departing from the inventive concept herein described. Such modifications being within the ability of one skilled in the art are intended to be covered herein with the invention only being limited by the appended claims.

It is claimed:

1. Process for producing a water-soluble synthetic resin coating composition capable of electrodeposition comprising the steps of (A) partially condensing (1) a polycarboxylic acid resin selected from the group consisting of (a) adducts of a dienophilic compound and a member of the group consisting of an ethylenically unsaturated oil fatty acid, rosin acid, an ethylenically unsaturated oil fatty acid glyceride, and a hydroxy-free polyester containing at least a portion of radicals selected from the group consisting of ethylenically unsaturated fatty acids and rosin acids, and (b) a polyester resin produced by the condensation of poly-carboxylic acids with polyvalent alcohols, said polycarboxylic acid resin having an acid value of from 30–200 which is exclusively or substantially exclusively contributed by partially esterified aliphatic and/or hydroaromatic polycarboxylic acids, and (2) an aminoplast resin by heating at a temperature below about 120° C., and (B) neutralizing the reaction product of (A) with a water-soluble nitrogen base to provide a water-soluble coating composition.

2. The process of claim 1 wherein the aminoplast resin is insoluble in water.

3. The process of claim 2 wherein the polycarboxylic acid resin contains primary hydroxyl groups of partially esterified polyols.

4. The process of claim 2 wherein the adduct includes hydrolyzed anhydride groups.

5. The process of claim 4 wherein the adduct is partially esterified with polyols.

6. The process of claim 2 wherein the polycarboxylic acid resin contains olefinic groups and is modified through copolymerization with monovinyl compounds.

7. The process of claim 2 wherein a polycarboxylic acid resin is used, the acid value of which is contributed substantially by partially esterified aliphatic and/or hydroaromatic polycarboxylic acids with not more than about an acid value of 20 being contributed by partially esterified aromatic polycarboxylic acids.

8. The process of claim 2 wherein the aminoplast resin is a polymethylol compound produced from formaldehyde and amino compounds etherified with aliphatic monohydric alcohols.

9. The process of claim 8 wherein at least half of the methylol groups of the polymethol compound are esterified.

10. The process of claim 1 wherein the polycarboxylic acid resin is unmodified.

11. The process of claim 1 wherein the polycarboxylic acid resin is modified with a monocarboxylic acid.

12. A water-soluble synthetic resin coating composition capable of electrodeposition comprising the reaction product obtained by (A) partially condensing (1) a polycarboxylic acid resin selected from the group of (a) adducts of a dienophilic compound and a member of the group consisting of an ethylenically unsaturated oil fatty acid, rosin acid, an ethylenically unsaturated oil fatty acid glyceride, and a hydroxy-free polyester containing at least a portion of radicals selected from the group consisting of ethylenically unsaturated fatty acids and rosin acids, (b) a polyester resin produced by condensation of polycarboxylic acids with polyvalent alcohols, said polycarboxylic acid resin having an acid value of 30–200 which is exclusively or substantially exclusively contributed by partially esterified aliphatic and/or hydroaromatic polycarboxylic acids, and (2) an aminoplast resin by heating at a temperature below about 120° C., and (B) neutralizing the water-insoluble reaction product of (A) with a water-soluble nitrogen base to provide said water-soluble coating composition.

13. The composition of claim 12 wherein the aminoplast resin is insoluble in water.

14. The composition of claim 12 wherein the polycarboxylic acid resin contains primary hydroxyl groups of partially esterified polyols.

15. The composition of claim 12 wherein the adduct includes hydrolyzed anhydride groups.

16. The composition of claim 15 wherein the adduct is partially esterified with polyols.

17. The composition of claim 12 wherein the polycarboxylic acid resin contains olefinic groups and is modified through copolymerization with monovinyl compounds.

18. The composition of claim 12 wherein a polycarboxylic acid resin is used, the acid value of which is contributed substantially by partially esterified aliphatic and/or hydroaromatic polycarboxylic acids with not more than about an acid value of 20 being contributed by partially esterified aromatic polycarboxylic acids.

19. The composition of claim 12 wherein the aminoplast resin is a polymethylol compound produced from formaldehyde and amino compounds etherified with aliphatic monohydroxyl compounds.

20. The composition of claim 19 wherein at least half of the methylol groups of the polymethylol compound are etherified.

21. The composition of claim 12 wherein the polycarboxylic acid resin is unmodified.

22. The composition of claim 12 wherein the polycarboxylic acid resin is modified with a monocarboxylic acid.

References Cited
UNITED STATES PATENTS

| | | | |
|---|---|---|---|
| 2,853,459 | 9/1958 | Christenson et al. | 260—21 |
| 2,915,486 | 12/1959 | Shelley | 260—21 |
| 3,230,162 | 1/1966 | Gilchrist | 204—181 |
| 3,300,424 | 1/1967 | Hoenel et al. | 260—21 |
| 3,338,743 | 8/1967 | Laganis | 260—850 |
| 3,394,093 | 7/1968 | Salem | 260—21 |

OTHER REFERENCES

Chemical Abstracts, vol. 53, No. 21, Nov. 10, 1959, p. P20840c.

DONALD E. CZAJA, Primary Examiner

R. W. GRIFFIN, Assistant Examiner

U.S. Cl. X.R.

117—132, 161; 204—181; 260—18, 22, 23, 29.2, 29.4, 32.4, 32.6, 33.4, 39, 40